United States Patent [19]

Klüh et al.

[11] Patent Number: 5,543,100
[45] Date of Patent: Aug. 6, 1996

[54] METHOD FOR MAKING ARTIFICIAL ROCKS, IN PARTICULAR LARGE-SCALE ROCK IMITATIONS

[75] Inventors: Gorden Klüh, Schweinfurt; Sven Precht, Oberwerrn, both of Germany

[73] Assignee: FA. Felsdekor Kluh und Precht, Dittenbrunn, Germany

[21] Appl. No.: 403,462

[22] Filed: Mar. 14, 1996

Related U.S. Application Data

[63] Continuation of Ser. No. 983,439, Dec. 2, 1992, Pat. No. 5,443,774.

[51] Int. Cl.⁶ ........................... B29C 33/40; B29C 33/56; B29C 41/20
[52] U.S. Cl. .......................... 264/130; 264/131; 264/220; 264/225; 264/227; 264/257
[58] Field of Search ................................. 264/131, 130, 264/219, 220, 225, 226, 227, 257; 425/2; 428/15

[56] References Cited

U.S. PATENT DOCUMENTS

| | | | |
|---|---|---|---|
| 962,924 | 6/1910 | Simpson | 264/220 |
| 1,038,115 | 9/1912 | Gillies | 264/220 |
| 1,809,329 | 6/1931 | Bossi et al. | 428/15 |
| 3,103,168 | 9/1963 | Braznell et al. | 264/227 |
| 3,312,761 | 4/1967 | Vida | 264/219 |
| 3,379,812 | 4/1968 | Yakovou | 264/227 |
| 3,836,619 | 9/1974 | Volent | 264/131 |
| 3,917,786 | 11/1975 | Weigert | 264/227 |
| 3,950,477 | 4/1976 | Di Giacomo | 264/226 |
| 4,385,088 | 5/1983 | Baskin | 428/15 |
| 4,657,791 | 4/1987 | Ukkonen | 428/15 |
| 4,668,451 | 5/1987 | Langson | 264/225 |
| 4,940,558 | 7/1990 | Jarboe | 264/225 |
| 4,950,346 | 8/1990 | Seele | 156/245 |
| 5,250,250 | 10/1993 | Gorski | 264/227 |
| 5,395,577 | 3/1995 | Gorski | 264/227 |

FOREIGN PATENT DOCUMENTS

| | | | |
|---|---|---|---|
| 1930764 | 10/1970 | Germany . | |
| 3334396 | 4/1985 | Germany | 264/227 |
| 3740682 | 6/1989 | Germany . | |

Primary Examiner—Jay H. Woo
Assistant Examiner—Duane S. Smith
Attorney, Agent, or Firm—Laff, Whitesel, Conte & Saret, Ltd.

[57] ABSTRACT

In order to manufacture low-weight, large-scale, artificial rocks resistant to weathering and faithfully rendered as in nature, first a malleable plastic reproduction is made of a natural-rock object. If called for, the reproduction is braced in a second method step, preferably by coating its back side with glass-fiber reinforced plastic. The work mold so manufactured receives a parting compound in a third operational step and thereupon preferably fiberglass mats are inserted and a coat of synthetic resin is applied to make a positive in the shape of a hollow artificial-rock blank. This artificial-rock blank is coated in a fourth operational step with a synthetic resin and fine-grain, preferably multicolored natural sand is deposited on or incorporated into the still moist coat of synthetic resin. Once this coat of synthetic resin with its incorporated natural sand has hardened, the artificial rock has been completed.

6 Claims, 1 Drawing Sheet

5,543,100

METHOD FOR MAKING ARTIFICIAL ROCKS, IN PARTICULAR LARGE-SCALE ROCK IMITATIONS

This is a continuation application of U.S. application Ser. No. 07/983,439, filed on Dec. 2, 1992, now U.S. Pat. No. 5,443,774.

FIELD OF THE INVENTION

The invention concerns a method for making artificial rocks, in particular large-scale rock imitations,

BACKGROUND OF THE INVENTION

It is known how to manufacture artificial rocks from correspondingly dyed concrete. However, such rocks are not weather-proof long-term, that is, when exposed to water, the concrete dyes are "washed out". Also such concrete rocks are comparatively heavy, adversely affecting their shipping and setup. Lastly, such concrete rocks frequently axe recognized as being imitations even from afar on account of the lack of typical rock structure and coloring of natural rocks.

SUMMARY OF THE INVENTION

The object of the invention is to create a method with which to manufacture artificial rocks, in particular large-scale rock imitations and which avoids the above drawbacks. In particular the rocks made by the method of the invention shall practically match the color and structure of natural rocks and furthermore they shall be both lightweight and weathering-proof over long periods.

This problem is solved by a method which in the invention is characterized by the following method steps:

(a) Making a plastic reproduction (negative) of a natural-rock object, for instance a rock, (b) Removing the reproduction from the natural-rock object and bracing the reproduction by coating its back side with a hardening plastic, fop instance glass-fiber reinforced plastic, (c) Following hardening the coating on the back side, rotating the reproduction into an operational position wherein the reproduction can be used as a work mold, (d) Introducing a parting compound and a hardening plastic and where called for inserting reinforcing means, for instance fiberglass mats, into the work mold which then are coated with a synthetic resin to shape a positive in the form of a hollow blank of an artificial rock, (e) Removing the hardened artificial-rock blank from the work mold and depositing a synthetic resin coat on the blank of artificial rock, and (f) Depositing and incorporating (embedding) natural sand of fine granularity onto or where called for into the still moist coat of synthetic resin and also thereupon drying and hardening the synthetic resin coat with incorporated natural sand.

The method of the invention allows manufacturing in particular large-scale, weathering-proof artificial rocks faithful to nature and of comparatively low weights. The plastic used to make the reproduction (negative) may consist of economical silicone rubber. Because this reproduction as yet lacks dimensional stability required of a work mold, it is braced in accordance with feature (b) on the back side by a hardening, preferably glass fiber reinforced plastic. The blank of the artificial rock preferably is made from a glass-fiber reinforced plastic which, however, also may be replaced by a pressure-setting plastic, a hard PVC or by a polyester.

An alternative solution of the above problem is characterized by the following method steps:

(a) Preparing a reproduction (negative) of a malleable and hardening plastic from a natural-stone object, for instance a rock, (b) Removing the reproduction from the natural-rock object and rotating the reproduction into an operational position in which, following hardening, the reproduction can be used as a work mold, (c) Introducing a parting compound and a hardening plastic and where called for inserting reinforcing means such as fiberglass mats into the work mold which then are coated with a synthetic resin to produce a positive in the form of a hollow blank of an artificial rock, (d) Removing the hardened blank of artificial rock from the work mold and depositing a coat of synthetic resin onto the blank of artificial rock, and (e) Depositing and incorporating (embedding) a fine-grain, natural sand onto or into the still moist coat of synthetic resin and then drying and hardening the synthetic resin coat with incorporated natural sand.

In this procedure, a malleable plastic is used for making the reproduction, which shall be sufficiently dimensionally stable following hardening to serve directly as the work mold.

In order to faithfully imitate the color of natural rocks of different colorations, multicolored natural sands will be correspondingly and advantageously deposited on or incorporated into the still moist coat of synthetic resin.

Where the artificial stones are imitations for instance of millstones, feeding troughs etc., a monochrome natural sand also can be used. The preferred grain sizes of natural sands are in the range from 0.063 to 0.63 mm. Depending on the structure of the natural rock, grain sizes from 0.63 to 2 mm also may be used.

BRIEF DESCRIPTION OF THE DRAWINGS

The invention is elucidated below in relation to the drawing of an illustrative implementation.

DESCRIPTION OF THE PREFERRED EMBODIMENTS

According to the method of the invention, artificial rocks, in particular large scale rocks can be manufactured as reproductions of the most diverse shapes and colors faithfully reflecting the natural kind. Illustratively they may be used as large-scale rock imitations in landscaping gardens, in zoological facilities etc. and on a smaller scale as art objects (household fittings). For instance to make an imitation rock, a reproduction (negative)2 from a natural rock 1

Figure 1:
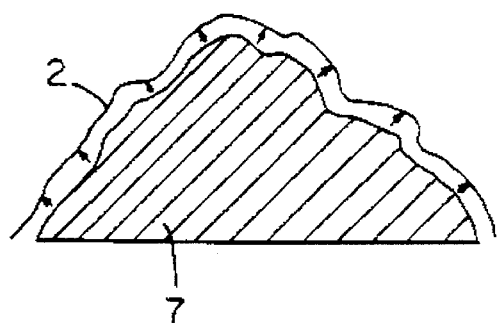
FIG. 1 is a side elevational view of the first method step for the manufacture of an imitation of a natural rock.
Figure 2:
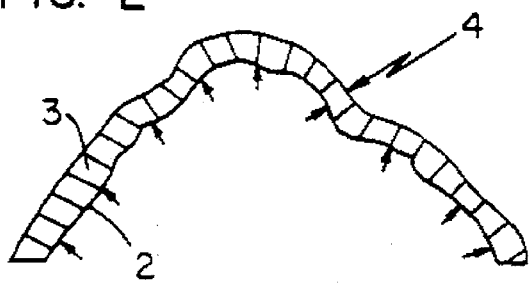
FIG. 2 is a side elevational view of the second method step for the manufacture of an imitation of a natural rock.

(FIG. 1) is first made using an economical malleable plastic such as silicone rubber. Following its removal from the natural rock 1, this reproduction 2 must be made dimensionally stable or be braced. For that purpose the back side of the reproduction 2 is coated with a glass fiber reinforced plastic 3 in a second method step (FIG. 2). After hardening of this backside coat 3, the actual work mold 4 for manufacturing the rock imitations is then ready, which merely requires being rotated by 180° into an operational position (omitted).

First a parting compound is introduced into the work mold 4 and then fiberglass mats are inserted and coated with synthetic resin. In this manner a positive is obtained in the form of a hollow rock blank 5 of which the structure and contour match that of the natural rock 1.

Figure 3:
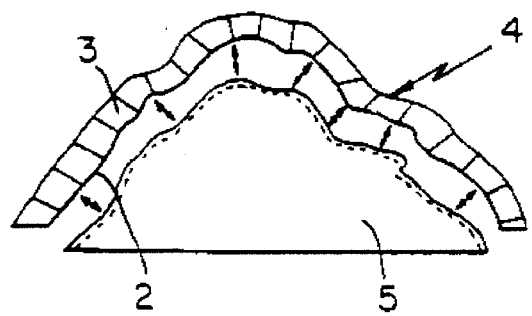
FIG. 3 is a side elevational view of the third method step for the manufacture of an imitation of a natural rock.
Figure 4B:
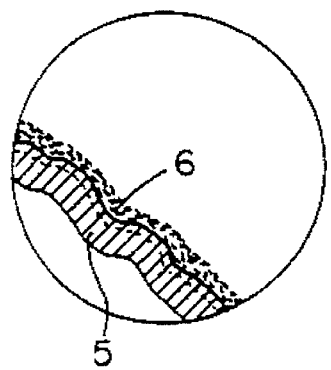
FIG. 4 is a side elevational view of the fourth method step for the manufacture of an imitation of a natural rock, FIG. 4 also shows an enlarged portion of the imitation of a natural rock.
Figure 4A:
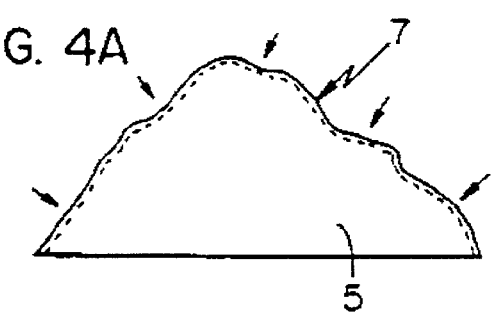

After the hardened rock blank 5 has been removed from the work mold 4 (FIG. 3), a coat 6 of synthetic resin is deposited on the blank 5 in a fourth method step (FIG. 4) and fine-grained, multicolored natural sand is deposited onto the still moist synthetic resin coat 6 in order to faithfully imitate the color tones and shades of the natural rock 1. Thereupon the synthetic resin coat 6 is dried together with the incorporated natural sand and as a result it hardens. The rock imitation 7 corresponding to the natural rock 1 is then finished.

Preferably the wall thickness of the rock blank 5 shall be about 4 mm, and the synthetic-resin coat 6 with the incorporated natural sand evinces a thickness of about 2 mm. The preferred grain sizes of the natural sand being used are in the range of 0.063 to 0.63 mm. Advantageously the work mold 4 is reusable several times.

The bracing of the reproduction 2 to create the work mold 4 also can be implemented using a pressure-setting plastic, a hard PVC or polyesters.

Lastly the reproduction 2 also can be made from a malleable, hardening plastic of such wall thickness that it shall provide directly upon its hardening the dimensional stability required for its use as work mold. This feature saves one method step.

In lieu of using the glass-fiber reinforced plastic to make the rock blank 5, other materials such as a pressure-setting plastic, a hard PVC or polyesters may be used.

We claim:

1. Method for manufacturing artificial rocks comprising the steps of:
   (a) making a malleable-plastic reproduction negative from a natural-rock object,
   (b) removing the reproduction from the natural-rock object and moving the reproduction into a work position after hardening of said reproduction for use as a work mold,
   (c) adding a parting compound and a hardening plastic into the work mold and coating the work mold with synthetic resin to make a positive in the form of a hardened hollow artificial rock blank,
   (d) removing the hardened artificial-rock blank from the work mold and depositing a coat of synthetic resin onto the hardened artificial-rock blank, and
   (e) creating an artificial rock surface by depositing and embedding fine-grain natural send onto and into the still moist coat of synthetic resin to imitate the color and structure of natural rocks, and thereupon drying and hardening the coat of synthetic resin with the incorporated natural sand.

2. Method defined in claim 1, wherein reinforcing means is added into the work mold with the hardening plastic in step (d).

3. Method defined in claim 2, wherein the reinforcing means is fiberglass mats.

4. Method defined in claim 1, wherein, in order to faithfully imitate a multicolored natural rock, multicolored natural sand is deposited on the still moist coat of synthetic resin.

5. A method for manufacturing artificial rocks comprising the following steps:
   making a hollow reproduction of a natural rock object, removing the reproduction from the natural rock and moving the reproduction into a work position wherein the reproduction can be used as a mold, said method further comprising the steps of:
   (a) introducing a hardening parting compound into the mold,
   (b) hardening said parting compound,
   (c) following hardening of the parting compound, coating the mold with a thin coat of synthetic resin,
   (d) creating an artificial rock surface by depositing and incorporating fine-grain natural sand on and into the still moist coat of synthetic resin to imitate the color and structure of the natural rocks,
   (e) coating the incorporated fine-grain natural sand with a hardening plastic to form and brace the hollow-natural rock imitation, and
   (f) removing the formed and braced natural-rock imitation from the mold.

6. Method defined in claim 5, wherein, before being used as a mold, the reproduction is braced by coating the reproduction's back side with a hardening plastic and by hardening said plastic.

\* \* \* \* \*

UNITED STATES PATENT AND TRADEMARK OFFICE
CERTIFICATE OF CORRECTION

PATENT NO.  : 5,543,100
DATED       : August 6, 1996
INVENTOR(S) : Klüh, Gorden; Precht, Sven It is certified that error appears in the above-indentified patent and that said Letters Patent is hereby corrected as shown below:

Title page, item [73] should read:

[73]  Assignee:  FA. Felsdekor Klüh und Precht
      Dittelbrunn, Germany

Title page, item [22] should read:

[22]  Filed: Mar. 14, 1995

Column 1, Line 40:  Replace "fop" with "for"

Column 2, Line 52:  Replace "4" with "4A"

Column 2, Line 54:  Replace "4" with "4B"

Column 4, Line 11:  Replace "send" with "sand"

Signed and Sealed this

Eighteenth Day of February, 1997

Attest:

BRUCE LEHMAN

Attesting Officer     *Commissioner of Patents and Trademarks*